Jan. 14, 1941.  M. Q. LEAMING  2,228,393
THROTTLE VALVE CONTROL APPARATUS
Filed Jan. 27, 1938  5 Sheets-Sheet 1

Inventor
M. Q. Leaming
By Lester L. Sargent
Attorney

Jan. 14, 1941.  M. Q. LEAMING  2,228,393

THROTTLE VALVE CONTROL APPARATUS

Filed Jan. 27, 1938  5 Sheets-Sheet 3

Inventor
M. Q. Leaming
By Lester L. Sargent
Attorney

Jan. 14, 1941.   M. Q. LEAMING   2,228,393
THROTTLE VALVE CONTROL APPARATUS
Filed Jan. 27, 1938   5 Sheets-Sheet 4

Inventor
M. Q. Leaming
By Lester L. Sargent
Attorney

Patented Jan. 14, 1941

2,228,393

UNITED STATES PATENT OFFICE 2,228,393

THROTTLE VALVE CONTROL APPARATUS

Morrell Q. Leaming, Tampa, Fla.

Application January 27, 1938, Serial No. 187,332

17 Claims. (Cl. 137—139)

This invention relates to an apparatus and a method of regulating or controlling the power output, or speed of operation of automotive gas engines. Ordinarily, this is accomplished by the use of highly standardized devices installed by the manufacturers of automotive vehicles, as regular equipment usually consisting of some form of mechanical linkage connecting the throttle valve of the engine to a manually operated lever, or to a foot pedal usually operating against the tension of a return spring and commonly known as an accelerator or gas feed, or to a combination of both methods functioning separately or together.

While operating a vehicle by the above described methods of control, it is often necessary and desirable to transfer a foot from a foot gas feed pedal to a foot brake pedal or to another foot operated device and at the same time maintain or regulate the engine speed. Under these conditions this could not ordinarily be accomplished except by the removal of a hand from the steering wheel of the vehicle for the purpose of operating a hand throttle-control lever, or a mechanical push-pull button which is often situated in a place somewhat inconvenient for easy manipulation.

Also because of this inconvenience, it has been customary and often necessary to hold one foot on a foot gas feed pedal for long periods of time. This may become very tiresome to the operator because of his inability to relax the foot pressure from the gas feed without deceleration of the motor speed, because of the operation of the foot pedal return spring which will immediately act to close the engine throttle valve.

Another inconvenience that exists, particularly in many automotive vehicles of more recent design, is that the steering apparatus is so designed that one or more complete revolutions of the steering wheel is required for the purpose of completing a sharp right or left turn of the vehicle. This condition may result in an awkward movement of the hand or wrist, particularly if the driver is signaling with the other hand.

As a means of overcoming this inconvenience, there have been designed steering knobs, or handles for attachment to steering wheels for the purpose of providing a form of hand crank by which the operator may rotate the steering wheel for as many revolutions as are required, and in a more natural position and without the necessity of removing the hand from the wheel to obtain a more advantageous hold on another part of the wheel rim.

An object of this invention is to provide a means of improving such automotive operating conditions as has been stated in the preceding paragraphs, and for which I have designed an electrically operated gas engine throttle control system.

A further object of this invention is to provide a novel apparatus for controlling an automotive gas engine throttle valve, electrically, from a place on or near the rim of the steering wheel of the vehicle by means of an especially constructed and manually operated electric switch, designed as a part of an especially constructed steering knob.

Another object of this invention is to provide an especially designed steering wheel; embodying in its design a means for concealing electrical conductors in a spoke or conduit, constructed as a part of the wheel, which conduit will extend from within the wheel hub, to an outlet or or near the wheel rim, which outlet will provide a means for mounting a steering knob, or the switch-knob of the system, and at which point the mounting will also provide a concealed means for the connection of electrical conductors at the point where the mounting and the switch knob join.

The principal working part of this invention is the power unit, the same being connected electrically to the switch-knob of the system, and mechanically connected to the engine throttle valve.

I attain these and other objects of my invention by the mechanism illustrated in the accompanying drawings, in which—

Fig. 17½ is a detail plan view of the steering knob mounted on the steering wheel showing the position of the hand of the operator on the device;

Like characters of reference designate like parts in each of the several views.

Figures 1, 2, 3:
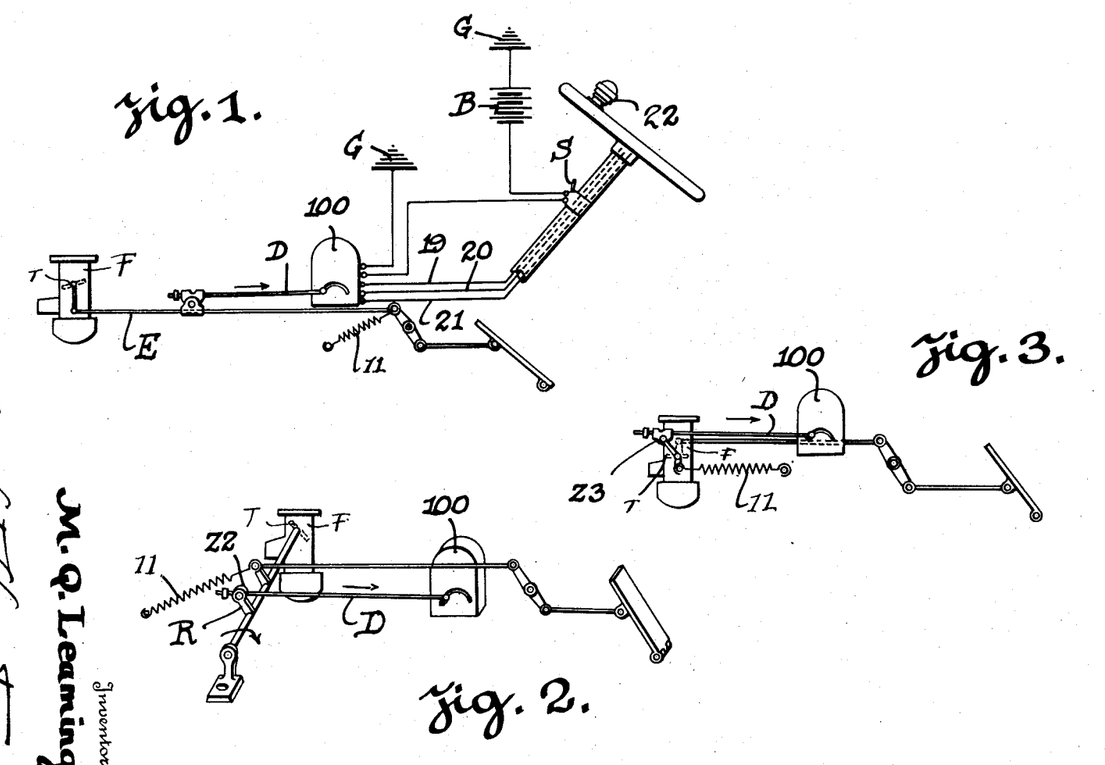
Figure 1 is a side elevation of the invention shown partly in diagram with the throttle in closed position.
Fig. 2 is a perspective view of another means for installation of the apparatus, connecting the power unit with the throttle valve, with the throttle in partly open position.
Fig. 3 is a view of another means for installing the apparatus, connecting the power unit with the throttle valve, the throttle valve being in closed position.
Figures 13, 14, 15, 16, 17:
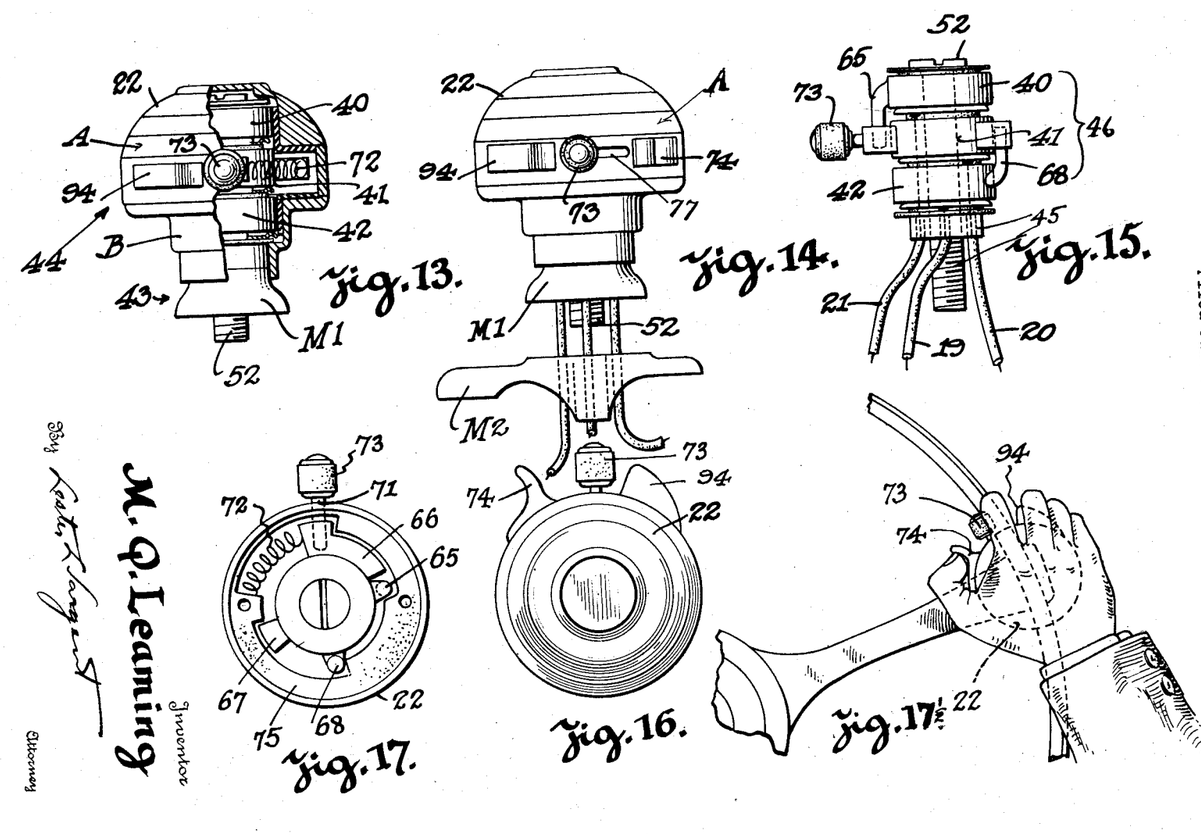
Fig. 13 is a view partly in elevation and partly in section of my steering knob, reversed 180 degrees from its normal position on the steering wheel to show members 94, 73 and 72.
Fig. 14 is an external side elevation of the steering knob, reversed 180 degrees from its normal position on the steering wheel to show members 94, 73 and 72, and slot 77.
Fig. 15 is an elevation of the electric switch of the steering knob showing the assembled arrangement of the contact points and the points of attachment of the wires to the commutator brushes.
Fig. 16 is a top plan view of the cap and other visible parts of the steering knob in a normal position on the steering wheel.
Fig. 17 is a top plan view of the steering knob switch as it appears from the cap end with the cap removed.

Referring to the drawings, Figs. 1, 2 and 3 represent three different modes of installing the apparatus, the principal features of which are steering knob 22 mounted on the steering wheel and carrying a switch member, of which parts 40, 41, and 42 carrying contact points 65, 66, 67 and 68 (Fig. 20), are revoluble in their relation to machine screw 52, as shown in Fig. 15 and which parts 40, 41 and 42 are electrically wired to a motor unit 100, which in turn is operatively collected by a link mechanism D with the rod E which is operatively connected with the throttle valve T of the engine carburetor F.

The power unit is an electrical mechanical device, being an assemblage of electrical and mechanical parts inclosed within a case or housing 9 and forming a unit to be attached mechanically to the throttle valve of an automotive gas engine in any of the three ways illustrated in Figs. 1, 2 and 3. The power unit 100 is designed for the purpose of operating the engine throttle valve by the action of electric current acting upon an electric motor contained within the unit, and controlled by a manually operated electric switch 22 placed on the steering wheel in a position on or near its rim.

Figure 4:
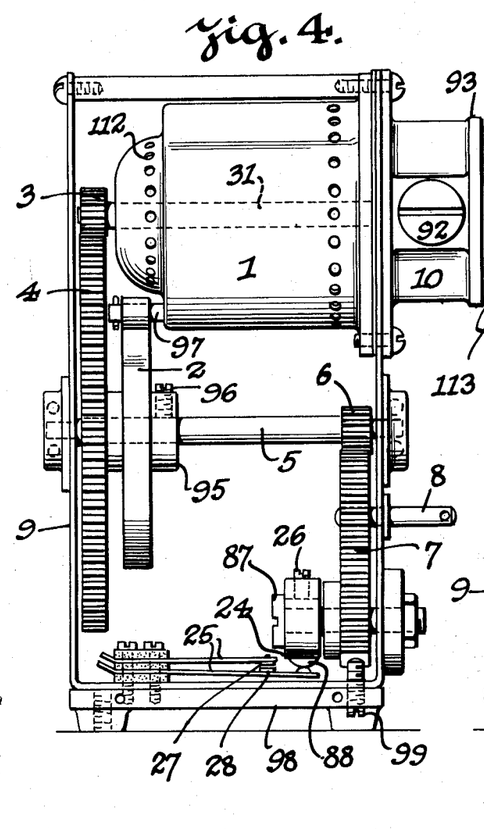
Fig. 4 is a side elevation of the power unit.
Figure 5:
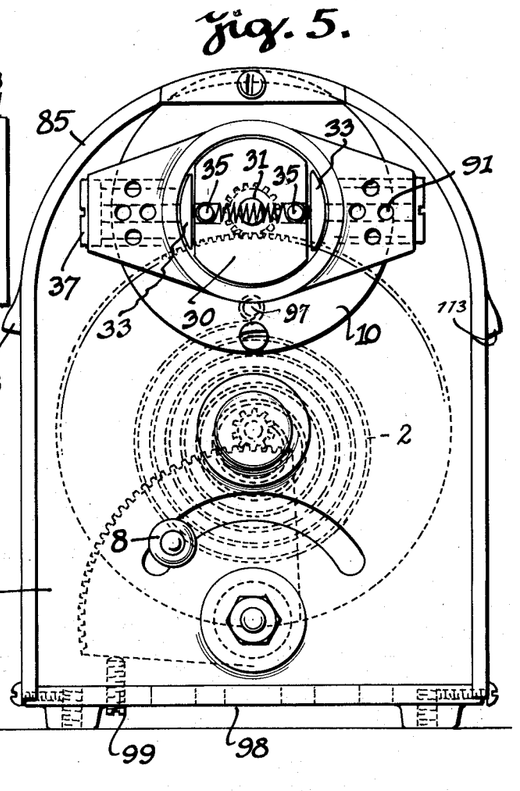
Fig. 5 is a front plan view of the power unit.

Referring to Fig. 4, I provide an electric motor 1, the driving action of which is in opposite direction from that of the spring motor 2. Both are limited in their travel and alternate in their driving action. The electric motor 1 receives its electric motive force from a source independent of the throttle control system. The spring motor 2 receives its stored energy from electric motor 1. The electric motor 1, because of its mechanical connection with the engine throttle valve through a system of speed reduction gears and the linkage D transmits mechanical motion from the electric motor to the engine throttle valve when an electric current is applied to the motor circuit. As shown in Figs. 4 and 5, the electric motor 1 has a shaft 31 carrying the pinion 3 which drives a large gear 4 mounted on shaft 5. Shaft 5 in turn carries a pinion 6 which drives the gear segment 7. Gear segment 7 drives the power take-off pin 8; all this mechanism being enclosed in the housing 9. I also provide an electric brake 10 which has two magnets, the head of one being shown as 92, and a brake cover 93, as shown in Fig. 4.

A return spring 11 is used on the three methods of installation shown in Figs. 1, 2, and 3.

Customarily, a throttle closing spring of similar design is furnished as regular automotive factory equipment and it is intended that this spring will continue to perform the operation of closing the throttle valve after the throttle control system is installed. The action of return spring 11 is only incidentally related to that of the spring motor 2, of the power unit, and while it may, under certain conditions, assist the spring motor 2, it is not required to do so for the purpose of returning the power unit to the closed-throttle position. This arrangement establishes the power unit as a means of opening the throttle valve, and spring 11, Figs. 1, 2, and 3 as a means of closing it.

Figures 6, 7, 8, 9, 10, 11, 12:
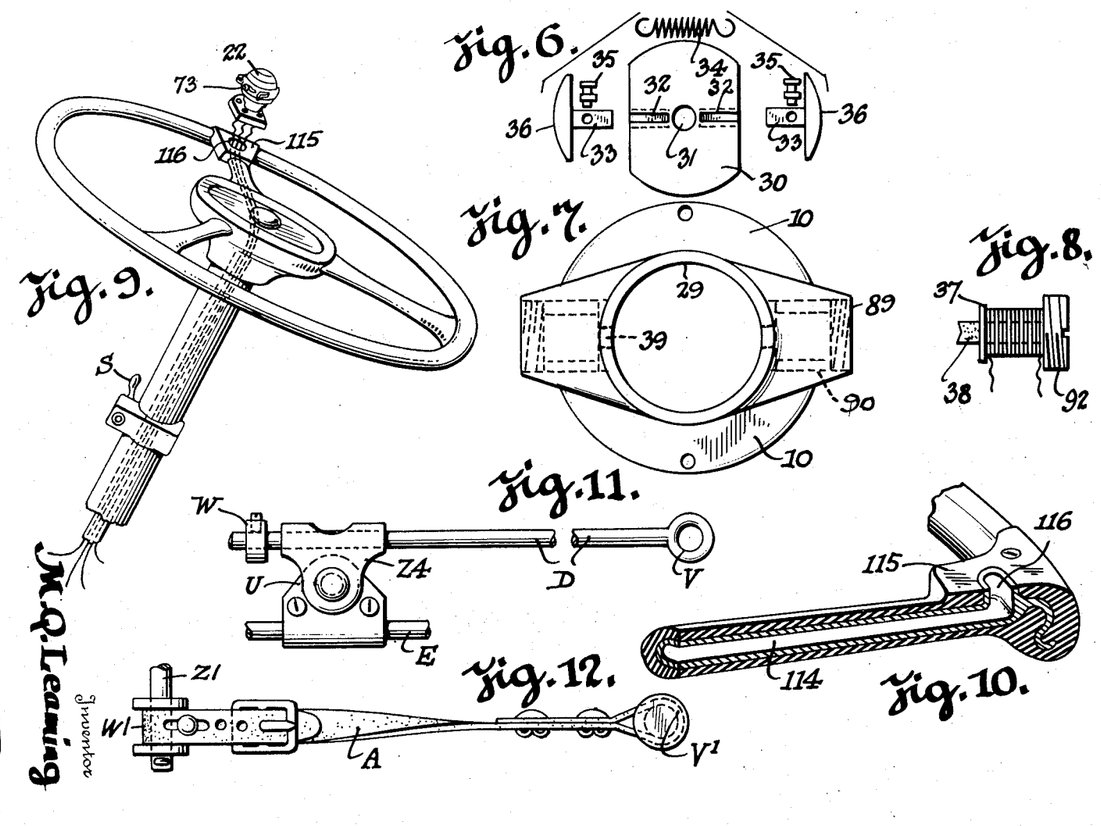
Fig. 6 is a detail view of the rotor 30 and associated parts.
Fig. 7 is a front plan view of the rotor casing.
Fig. 8 is a detail view of members 37 and 38.
Fig. 9 is a perspective view of the steering wheel designed for installation of my device, with the wires concealed in one of the spokes of the steering wheel.
Fig. 10 is a detail section through a portion of a steering wheel especially designed for installing my apparatus.
Fig. 11 is a detail side elevation of one form of link mechanism for linking the power unit to the engine throttle valve.
Fig. 12 is a plan view of another form of link element.

By the foregoing description it may be seen that the power unit of the system in its application of movement to the throttle valve, is similar to the application of pressure on the foot throttle or gas feed pedal. As the power unit acts to operate the throttle valve and as the regular gas feed pedal or button is intended for the same purpose, it is obvious that both have a mechanical connection to either the throttle valve or to each other, and as a means of preventing, as near as possible, conflicting mechanical operation between the several connected throttle operating devices, a form of mechanical linkage designed as a part of the throttle control system is provided, as shown in Figs. 4, 11 and 12.

I provide adjustable circuit breaker elements 24 and 25 which are placed in the primary circuit of the apparatus to stop the electric motor 1 automatically at a predetermined position, which may be adjusted by a set screw 26, shown in Fig. 4. I provide a cam 24 which is attached to the rotating hub of gear segment 7 and rotates with that gear around a common axis which is the retaining bolt 87. Cam 24 has a cam button 88 which by striking the lower element of the circuit breaker 25 opens the contact points 27 and 28.

Member 98 shown in Fig. 4 is the power unit mounting and the member 99 is a travel limit screw to limit the movement of gear segment 7.

The rate of the operating speed of the device in either direction is governed by an especially constructed electrical-mechanical braking unit 10. This braking unit 10 is a combination of an automatic speed limiting governor and an electric brake which may be designated as semi-automatic because of its being directly under the control of the operator of the vehicle through the operation of a relay (not shown) connected to and controlled by switch 22. The speed limiting member of the braking unit 10 is designed with a stationary member 29 as shown in Fig. 7, and a rotary member 30, as shown in Fig. 5.

The rotary member, or rotor, is attached to the shaft 31 of the electric motor 1 of the power unit and rotates with the same. The rotor 30, shown in Fig. 5 is in the general form of a disk and rotates in the same plane as the armature of the electric motor. As a part of the rotor disk 30, there are two slotted guides 32 and 32 placed diametrically opposite each other and radiating lengthwise from the axis of the disk, as shown in Fig. 6. These slotted guides are for the purpose of guiding the movement of two sliding weights 33 and 33. The ends of the weights nearest each other are connected to each other by a regulating spring 34, as shown in Fig. 6 which is hooked in the pins 35 and 35, which are also attached to the guiding projections of the weights. The tension of spring 34 is counter to the centrifugal action of the weights 33 and 33 when the same are rotating. The ends of the weights farthest from the axis of the rotor 30 are designed to act as frictional surfaces 36—36 and operate to make sliding frictional contact at a predetermined speed, with the inner frictional surfaces of the stationary braking member 29.

The interior of the stationary member 29 is cylindrical in shape and is fixed stationarily in its relation to rotor 30. The inner cylindrical surfaces of the stationary member 29 are spaced equidistant at all points from the outer periphery of the rotor disk 30, as shown in Fig. 5, and because of frictional contact with the sliding weights 33—33 of the rotor disk at a predetermined rotating speed, will act to automatically limit the speed of the movement of all of the moving mechanical parts of the power unit that are connected to the motor shaft.

The electrical braking member of the speed regulating unit 10 consists of two electro magnets 37—37, shown in Fig. 5, one of which is more clearly shown on Fig. 8. These magnets 37—37 are attached to the outside of the stationary member 29 in the position indicated in Fig. 5. The cores 38, as shown in Fig. 8, of each electro magnet project from the magnet body sufficiently to permit the insertion of the extended cores 38 into holes 39, as shown in Fig. 7, passing from the magnet sockets 89—89 to the inner cylindrical surface of the stationary member 29 and in a plane radially to the axis of the rotor 30.

The inserted ends of each electro magnet is machined flush with the contour of the frictional surface of the stationary member 29, as shown in Fig. 5 and together they present a continuous frictional surface to the frictional surfaces of the rotating member 30 of the braking unit.

Referring to Fig. 7, a housing 90 is provided as a part of the stationary member construction 29 for the purpose of embodying the magnet sockets 89—89. The sockets are ventilated by the holes 91—91, as shown in Fig. 5, and also they are threaded for a short distance back from their exterior openings to receive the threaded parts of each magnet head 92, as shown in Fig. 8.

The cover 93 of the electric brake 10, (Fig. 4), does not cover the holes 91—91 (Fig. 5), but only the exposed cylindrical end of the braking unit, which end is machined to accommodate the cover.

When the electro magnets 37—37, are energized by an electric current, the magnetic attraction is sufficient to draw the movable frictional surfaces 36—36, shown in Fig. 6, of the rotor 30, counter to the tension of the speed governing spring 34, and to a point directly under the core of each magnet and into frictional contact with the machined ends of the cores and the frictional surfaces of the stationary braking member 29. A combined effect of frictional action and magnetic attraction will stop or prevent the rotation of the rotor 30. When an electric current is applied to the electric motor 1 of the device for the purpose of operating the same, both the electric motor and the gearing and linkage attached thereto is moved only in a direction that will open the engine throttle valve, and by the same action, mechanical energy is stored in the clock type spring 2, (Fig. 5), heretofore identified as the spring motor of the power unit of the throttle control system.

The spring motor 2 is mechanically attached to shaft 5 in a manner that will cause the rotation of the power unit in a direction opposite to the power effort direction of the electric motor 1 when the stored energy of the spring motor is released. The driving element of the spring motor 2 is a flat clock type eccentrically coiled spring, having the active or inner coil end attached to a hub 95, shown in Fig. 4 and fastened to the shaft 5 by set screw 96. This arrangement will permit the tension of the spring to be adjusted by loosening the set screw 96 and rotating the hub independently of shaft 5 and resetting screw 96. The outer stationary end of the spring motor spring is attached to a pin 97 in the electric motor housing.

Referring to Figs. 4 and 5, a form of mounting 98, shown as the base of the power unit, represents a means of attaching this unit to a suitable part of the vehicle or vehicle engine. A mounting may be attached to the unit by rivets or machine screws or by welding, or it may be desirable to manufacture the mounting as an integral part of a casting that will include the mounting and the housing 9 of the power unit. The style of power unit mounting and its point of attachment to the power unit may vary considerably to conform to the peculiarities of automotive design.

A travel limit screw 99, as shown in Figs. 4 and 5 is provided for the purpose of limiting the return travel of gear segment 7, should this be desirable.

The holes 112, shown in the electric motor housing, (Fig. 4) are for the purpose of ventilating the motor. Ventilating ducts 113 (Fig. 5), are for the purpose of ventilating the interior of the power unit when the cover 85 is in place.

Referring to Fig. 11 of the drawings there is illustrated one form of link, designated D which is constructed so as to be operated at the eye V; the force of the pull being registered at the point where the collar W is fastened to the link, the pull being transferred to the members Z4 which is connected to the strap U secured to rod E whereby the force of the pull will be transmitted to the throttle-actuating equipment. In lieu of the metal link D, I may provide a flexible strap link A having an eye V1 at one end and an adjustable strap or eye connection W1 at the other end with an adaptor Z1. By this means the foot and motor unit control mechanism are linked to pull together or separately and the movement of either moves the throttle linkage in the same general direction, as indicated by the arrows (Fig. 1), and as would be the case when the throttle is opened no movement or mechanical interference would result between the foot or hand control, and the power unit control. Also by this same arrangement of the linkage, the power unit of the system, if desired, may remain at all times in a closed-throttle position.

Referring to Figs. 9 and 13, there is illustrated a steering knob 22, the stationary member of which, will include parts 43 and 52. The revoluble member of the steering knob is shown as 44. Within the hollow interior of the steering knob 22, there is constructed as a part of the knob construction an especially designed three-pole, two-circuit electric switch also constructed with a stationary member including parts 45 and 52, as shown in Fig. 15, and a revolving unit or group of members 46. This switch is for the purpose of opening or closing one or more electrical circuits while the knob 22 is revolving or at rest.

This action is made possible, in part, by using the bearing surfaces of the three bearings 40, 41, and 42 as commutators or sliding contacts for transferring the electrical currents from the stationary member 45 to the revolving unit or group of members 46, as shown in Fig. 15, or vice versa.

Figure 19:
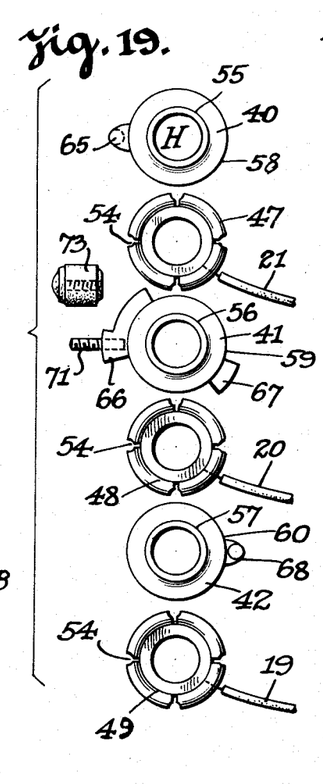
Fig. 19 is a detail plan view of the commutator bearings 40, 41, and 42, and of the disk brushes 47, 48, and 49.
Figure 20:
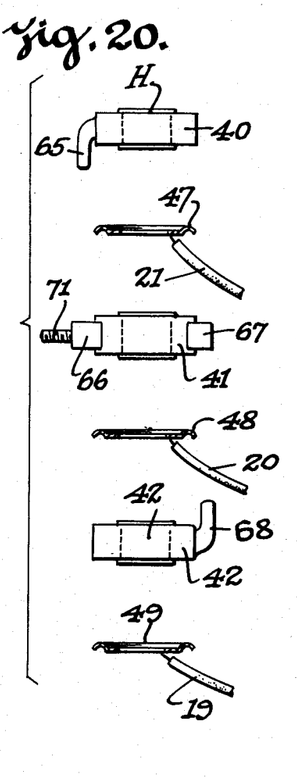
Fig. 20 is a detail side elevation of the commutator bearings 40, 41, and 42, and of the disk brushes 47, 48, and 49.

Referring to Figs. 15, 19 and 20, members 47, 48 and 49 represent the commutator brushes that operate to assist the bearing surfaces of the commutator bearings 40, 41 and 42 that conduct the electrical currents from their stationary to their rotary members.

Fig. 13 shows the arrangement of the principal parts of the switch unit contained within the knob 22. Referring again to Fig. 15 this unit is a mechanical assembly of three sets of ball bearings 40, 41 and 42, designed with stationary members 55, 56, and 57, as shown in Fig. 19, and rotating members 58, 59 and 60, and three disk-shaped brushes or sliding electrical contacts 47, 48 and 49, having attached electrical conductors 19, 20 and 21 and two insulating washers 50 and 51 (see Fig. 18) for separating and electrically insulating each commutator bearing and its companion brush from its adjacent commutator bearing and brush. The "backbone" or central staff of the switch assembly is a machine screw 52. Machine screw 52 is covered with a tubular insulation 53 that insulates the commutator bearings and brushes from it. It also has two specially designed insulating washers 61 and 62 at each end of the bearing assembly.

Referring to Fig. 19, the center holes of the commutator bearings 40, 41 and 42, and of the disk brushes 47, 48, and 49 and of the insulating spacers 50 and 51 (see Fig. 18), are of the same diameter as the outside of the tubular insulation 53 and all slide over this insulation tube to form the assembled unit, as shown in Fig. 15.

The commutator brushes 47, 48 and 49 are made of light weight tempered sheet metal and are disk shaped and slightly cupped and have a center hole the same size as that in the commutator bearings. Several short slots 54 are cut radially in each disk's edge at equal distances apart for the purpose of establishing flexibility when the disk is compressed flatwise, as shown in Fig. 15.

The compressing and retaining of the disks and commutator bearings and insulating spacers upon the tubular insulation is accomplished by means of a machine nut (not shown) on the threaded end of bolt 52. By this means the centers of the commutating disks 47, 48 and 49 are clamped flatwise between the central or stationary members 55, 56, and 57, as shown in Fig. 19 of each commutator bearing and its companion insulating washer.

The outer flexible edges of the commutator disks, because of their light contact with the outer rotating members 58, 59 and 60 of the commutator bearings, are free to rotate in sliding contact with the same, and also because of this slight compression contact, make a positive electrical connection with their companion bearings. Each commutator brush is electrically connected to one end of each of the wires or conductors 19, 20, 21 that lead from the interior to the exterior of the switch knob body. At their points of connection to their respective commutator brushes, the conductors 19, 20 and 21 enter insulated grooves or conduits, one of which is shown as 63, (Fig. 18) and designed as a part of the tubular insulation. An individual groove is provided for each conductor and it is placed in a position lengthwise with the body of the tubular insulation.

The lower end of the tubular insulation 64 (Fig. 18) will be seen to have a larger diameter than the part that passes through the holes of the commutator bearings. There are three holes in this larger section of the tubular insulation that coincide with the lower ends of the insulating grooves. This establishes a conduit and a conduit outlet respectively of each groove and hole for each of the conductors 19, 20 and 21 to the exterior of the switch knob.

Referring to Figs. 15, 16, and 17, each commutator bearing and one of the electrical contacts 65 or 66 or 67 or 68 and its companion commutator brush and attached wire or conductor, form an individual electrical pole of the switch. The switch knob contains three sets of the above stated parts, therefore it is a three-pole switch.

Referring to Fig. 15, the upper commutator bearing 40, and the lower commutator bearing 42, are shown with their electrical contacts 65 and 68. These are metallic projections that are placed in positions reversed in their relation to each other. The projections 65 and 68 fit into adjacent insulated recesses 69 and 70 (Fig. 18), in the switch knob case 22 (A and B) and therefore revolve in a fixed position in respect to each other and to the case and by this arrangement, also act as keys to drive the outer members of their respective commutator bearings when the case is revolved. Electrical contact points 66 and 67 of the center commutator bearing 41 are a part of the revolving member of the bearing as indicated in Fig. 19.

Referring to Figs. 15 and 17, the arrangement of contact points of the switch permits the alternate contact of point 66 on bearing 41, with point 65 on bearing 40 and point 67 on bearing 41 with point 68 on bearing 42. This arrangement established the center bearing 41, as shown in Fig. 15 to be alternately a pole of a circuit occupying conductors 20 and 21, or of a circuit occupying conductors 20 and 19, as shown in Figs. 15 and 20. This arrangement of polarity establishes the switch of the switch knob as having two individual electrical circuits operating alternately.

With reference to Fig. 20, the projections 66 and 67 are electrically and mechanically fixed to the outer members of the center commutator bearing 41 and revolve with the switch knob as do the projections of the outer members of the upper commutator bearing 40 and the lower bearing 42. But projections 66 and 67 are unlike the projections on bearings 40 and 42 in respect to the design of their electrical contact points because, as is indicated in Fig. 17, projection 66 is designed also as a mounting for the switch button stud 71, and also as a seat for an end of spring 72, which spring will be identified as the return spring of the switch. Return spring 72 acts to hold projection 66 in contact with point 65, which action does not affect the rotation of the steering knob for the reason that the return spring 72 is mounted in the rotating member of the knob.

Unlike the fixed contact points and outer members of commutator bearings 40 and 42, center bearing 41 and its contact projections 66 and 67 may oscillate sufficiently in their relation to the steering knob 22, as shown in Fig. 17 to engage its points alternately with point 65 or point 68.

Contact points 66 and 65 when held closed by return spring 72 will establish an electrical current through conductors 20 and 21 (Fig. 15.)

When button 73 (Fig. 17) is moved against the tension of return spring 72, the attached commutator bearing and points are rotated in a direction that will separate points 65 and 66. A continuation of this movement will bring points 67 and 68 into contact with each other, establishing an electrical circuit on conductors 19 and 20. (Fig. 15.)

Fig. 16 indicates the plan view of the top of the switch knob showing button 73. This button is movable either to the right or left in its relation to the cap, for the purpose of operating the interior switch mechanism. The movement of button 73 is facilitated by means of projections 74 and 94, designed as finger pieces, and attached to the cap, for preventing either the button or the cap from slipping in the hand.

Figure 18:
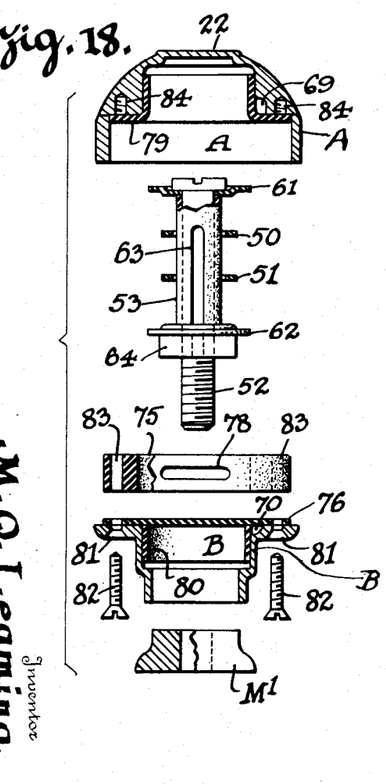
Fig. 18 is a detail view partly in side elevation and partly in section of parts of the steering knob mechanism detached from each other.

With reference to Figs. 17 and 18 and particularly to the electrical insulating elements of the steering knob; insulating ring 75 is designed to insulate return spring 72 from the inner cylindrical surface of the steering knob 22 of which cap A of the case is a part. Insulating washer 76 is for the purpose of insulating return spring 72 from the lower case member B.

The switch button stud 71 operates in the slot 77 (Fig. 14), shown on the side of the cap of the case, and is insulated from it by the slot 78, shown in the edge of the insulating ring 75 (Fig. 18). Because slot 78 is smaller than the slot 77 of the case, upper knob case A and switch button stud 71 (Fig. 17), cannot make electrical contact with one another. The switch button 73 is made of insulating material to prevent faulty switch operation or shock to the operator of the vehicle by short circuits that could be caused by jewelry or other metallic objects.

Fig. 18 shows the tubular insulation 53 fitted over the machine screw 52 for the purpose of insulating commutator bearings 40, 41 and 42 from the machine screw. Insulating bearing spacers 50 and 51 are designed to insulate the commutator bearings 40 and 42 from the center commutator bearing 41. Insulating washer 61 is designed to insulate commutator bearing 40 from machine screw 52 and from case A. Insulating washer 62 prevents the lower end of commutator bearing 42 from contacting by end thrust the metal of lower case B. Formed insulation 79 (case A) prevents commutator bearing 40 from making side contact with the metal of case A. Formed insulation 80 (case B) prevents commutator bearing 42 from making side contact with the metal of case B.

Referring to Fig. 18, upper case A and lower case B are held together by retaining screws 82—82 and apertures 81—81 shown in lower case B are machined to receive the retaining screws 82—82. Apertures 81—81 are aligned with apertures 83—83 passing through insulating ring 75, which apertures also are aligned with threaded apertures 84—84 in case A.

I may provide a simplified form of steering knob design (not shown in the patent drawings) in which are eliminated some of the insulating material that is required for the metal case construction design heretofore described. By manufacturing the steering knob of plastic materials or vulcanized rubber, there is obtained a unification of the lower case body B with the insulating ring 75 and insulating washer 76 and the formed insulation 80. The case A and the upper commutator bearing insulation 79 is also designed as a unit in this modification of the steering knob. This modification of the switch knob design is intended to result in a more cheaply manufactured product.

Referring to Figs. 13 and 14, part M1 represents an ornamental fillet, designed as a part of the steering knob base. In Fig. 14, M2 represents one form of conventional steering knob adaptor, and the illustration in Fig. 14 is only for the purpose of showing that a similar form of mounting would be necessary to adapt the switch knob of the system to a steering wheel not designed to incorporate a steering knob mounting.

Although it is understood that the part of the throttle control system pertaining to automotive steering knobs, as described in the foregoing paragraphs is primarily related to providing a suitable combination of steering knob and electric switch for operating the power unit of my system, it may also be understood that this invention will include such steering knob designs as have been previously described when these designs of steering knobs are used in connection with other electrical appliances not related to this throttle control system.

The operation of the invention is as follows: Assuming that the throttle control system is installed on an automotive vehicle in a manner favorable to the operation of the same, which will be, for example, by attaching the power unit to the vehicle by a suitable bracket or mounting that should be on or near the engine, or at some point that will be advantageous for the operation of the linkage connecting the power unit to the throttle valve; and that the steering knob 22 is mounted on or near the rim of the steering wheel—and that all the wiring is in its proper place and is connected to the various unit members, then with the engine running and the vehicle in motion, if the switch knob is grasped by the palm of the hand somewhat like grasping a door knob, it will be possible to steer the vehicle by the usual cranking motion for which steering knobs are designed, and also control the engine speed by the fingers of the same hand. Because of the finger pieces 74 and 94 (Fig. 16), the switch knob will not slip in the hand, but will rotate on its commutator bearings.

The finger pieces and the steering knob 22 and its switch are designed to permit their being grasped in a natural position, usually with the right hand. For example, by placing the thumb into the finger piece 74 and the middle finger to the right of finger piece 94, the index finger will be free to operate the control button of the switch.

When the hand is removed from the switch, the return spring 72 (Fig. 17), will hold the control button 73 all the way over to the right, which position is near the finger piece 94 (Fig. 16), and in this position the engine throttle will be closed. When button 73 is in this position, points 65 and 66 of unit 46 will be in contact, and an electric current of small intensity will hold the points of a relay (not shown) armature apart, interrupting all circuits within the power unit and by pushing button 73 to the left and off this position with the index finger, and continuing the movement all the way to the left, a contact within the knob 22 will be made through a relay (not shown) that will operate the electric motor of the power unit, which action will open the engine throttle. The extent of the opening movement of the throttle will depend upon the length of time the control button 73 is held to the left, which action may be continuous or intermittent, as desired.

After a desired engine acceleration is obtained, finger pressure against the button is released slightly and the throttle valve will be held at the position desired, by action of the electric brake, and the finger may hang relaxed in the space between the button and the finger piece 94, and in this position the finger will prevent the button 73 from being returned by the spring 72 to the closed throttle position.

To obtain deceleration from any previously set point of acceleration, the index finger is raised slightly from its relaxed position between the button 73 and finger piece 94, permitting button 73 to return to 94, this being the original starting position and corresponding to the closed throttle or idling position of the engine.

This action will provide a safety feature by causing the immediate closing of the engine throttle valve, should the hand of the operator lose contact with the switch knob. The decelerating action may be continuous or intermittent, as is the accelerating action. Any point of graduation of the opening or closing of the throttle valve may be obtained by the manipulation of the switch knob button 73, and the throttle position may be held indefinitely, or for the length of time button 73 is held in the neutral position between the finger pieces 74 and 94. Power for the decelerating movement is released by the spring motor 2, which power is stored in the spring of the spring motor during any accelerating action.

As the element of time is often important in the action of the throttle valve, provision has been made to meet the requirements of this condition by providing an adjustment by means of selecting a spring of the required tension for use on the speed governing mechanism of the power unit. The speed governor spring will act only to regulate the speed of continuous movement in either direction, which will be the highest obtainable under the governor regulation, and any desired speed less than the governor controlled speed is acquired by the operator by manipulating button 73.

A safety factor of operation of the power unit is made possible by the spring motor action, which acts to close the throttle valve, and which action as to stopping and starting is primarily under control of the electric brake for the duration of time that an electric current is applied to the electric brake. This will be for the duration of time that the engine ignition switch S (Fig. 1) is in contact, or set at "on" position, and should the ignition switch be returned to "off" position, or if for any other reason the battery circuit of the system is interrupted, the spring motor 2, will be free to act to close the throttle regardless of any previous setting of the same made by the operator of the vehicle.

What I claim is:

1. In an apparatus of the type described the combination with a steering wheel of a steering knob mounted on its rim having a stationary member and a manually operated revoluble switch member mounted within and forming part of the knob, the knob having bearing members and electric commutators for the purpose of conducting electric currents from the revoluble to the stationary member of the manually operated switch contained within the knob.

2. In an apparatus of the type described, the combination with an automotive steering wheel of a revoluble steering knob mounted on its rim, and an electric switch contained within the knob and positioned to be manually operated while the operator is grasping the knob while steering the vehicle or revolving the steering wheel of same, said revoluble switch being shaped to form a part of the knob.

3. In a throttle control device, the combination of a plurality of pairs of wires, an electric storage battery with which they are connected, a power unit with which they are also connected, and a steering knob mounted on or near the periphery of the steering wheel, and a rotary switch in said knob and electrically connected with the power unit, said power unit being mechanically connected with the throttle of an automotive engine.

4. In combination with the apparatus defined in claim 3, a mounting for the aforesaid steering knob affixed to the rim of the steering wheel and accommodating the base of the steering knob and switch mechanism.

5. In combination with an automotive steering wheel, a steering knob mounted on the rim of the steering wheel, a rotary switch contained in and forming a part of the steering knob, wires from said rotary switch, channels through the steering wheel in which said wires are concealed, and a power unit with which said wires are electrically connected, and means mechanically connecting said unit with the throttle valve of an automobile engine.

6. In combination with an automotive steering wheel, a steering knob, a rotary switch contained in and forming a part of the steering knob, wires from said rotary switch, and a power unit with which said wires are electrically connected, and means mechanically connecting said unit with the throttle valve of an automobile engine.

7. In an apparatus for electrically controlling an automotive gas engine throttle valve from the steering wheel, the combination of a steering knob mounted on the steering wheel, a revoluble electric switch forming a part of the steering knob, a power unit with which said electric switch is electrically connected, and a link mechanically connecting the power unit with the conventional throttle valve actuating mechanism.

8. In an apparatus for electrically controlling an automotive gas engine throttle valve from the steering wheel, the combination of a steering knob mounted on the steering wheel, a revoluble electric switch forming a part of the steering knob, a power unit with which said electric switch is electrically connected, and an adjustable link mechanically connecting the power unit with the conventional throttle valve actuating mechanism of an automotive engine.

9. In apparatus for electrically controlling an automotive gas engine throttle valve from the steering wheel, the combination of a steering wheel, a steering knob mounted on the rim of said steering wheel, a rotary switch carried by said steering knob, a power unit arranged to convert electro-motive force into mechanical movement to operate the throttle valve of an automobile engine, means for electrically connecting the rotary switch with the aforesaid power unit and mechanical means driven by the power unit and directly connected with the throttle valve for actuating the throttle valve when the power unit is actuated.

10. In apparatus for electrically controlling an automotive gas engine throttle valve from the steering wheel, the combination of a steering wheel, a steering knob mounted on the rim of said steering wheel, a rotary switch carried by said steering knob, a power unit arranged to convert electro-motive force into mechanical movement to operate the throttle valve of an automobile engine, means for electrically connecting the rotary switch with the aforesaid power unit and a link actuated by the power unit and directly connecting the power unit with the aforesaid throttle valve to actuate same.

11. In apparatus for electrically controlling an automotive gas engine throttle valve from the steering wheel, the combination of a steering wheel, a steering knob mounted on the rim of said steering wheel, a power unit arranged to convert electro-motive force into mechanical movement to operate the throttle valve of an automobile engine, means for electrically connecting the rotary switch with the aforesaid power unit, mechanical means driven by the power unit and directly connected with the throttle valve for actuating the throttle valve when the power unit is actuated, and a manually controlled rotary two-circuit electric switch carried by said steering knob.

12. In apparatus of the type described, the combination with a steering wheel of a steering knob mounted on the rim of the steering wheel, a manually revolvable knob switch contained within the steering knob, means for manually operating said switch while the knob is in motion, an operated element of the automobile and an electrical connection from said switch to the operated element of the automobile.

13. In an apparatus for controlling an automotive gas engine throttle valve from the steering wheel, the combination of a power unit including the casing, an electric motor mounted in said casing and arranged to open the throttle valve of the engine, a spring motor having a driving action opposite to that of the electric motor mounted in said casing, a shaft to which the spring motor is attached, a gear mounted on the same shaft, a pinion meshing with said gear and mounted on the shaft driven by the electric motor, a power take-off element geared to said shaft for reciprocatory movement, a cam member arranged to be actuated by said power element, an electric switch arranged to be opened by the cam member to stop the operation of the electric motor at a predetermined positional setting of the cam, a manually operated switch mounted on the rim of the steering wheel, and wiring electrically connecting the electric switch controlled by the cam member with the manually operated switch on the steering wheel and under control of the operator of the vehicle.

14. In an apparatus of the type described, a power unit comprising a casing, an electric motor mounted in said casing, and arranged to open the throttle valve of the engine, an adjustable spring motor having driving action opposite to that of the electric motor to automatically close the throttle valve also mounted in said casing, a shaft actuated by the electric motor and to which the spring motor is attached, a gear mounted on the same shaft, a pinion meshing in said gear and mounted on a shaft driven by the electric motor, a power take off element, being geared to said shaft for reciprocatory movement, a cam member actuated by said power take off element, an electric switch arranged to be opened by the cam member at a predetermined positional setting of the cam, and wiring connecting said switch with the electric motor circuit.

15. In an apparatus of the type described, a power unit comprising a casing, an electric motor mounted in said casing and arranged to open the throttle valve of the engine, an adjustable spring motor having driving action opposite to that of the electric motor to automatically close the throttle valve also mounted in said casing, a shaft actuated by the electric motor and to which the spring motor is attached, a gear mounted on the same shaft, a pinion meshing with said gear and mounted on a shaft driven by the electric motor, a power take off element being geared to said shaft for reciprocatory movement, a cam member actuated by said power take off element, an electric switch arranged to be opened by the cam member at a predetermined positional setting of the cam, and wiring connecting said switch with the electric motor circuit of the apparatus, and a semi-automatic electric braking unit.

16. In an apparatus of the type described, the combination with an automotive steering wheel of a steering knob attached on or near its periphery, an electric switch mounted in and forming a part of said steering knob, said switch including a stationary member and a revoluble member, means for transferring electric current from the stationary member to the revoluble member, wiring from said switch to a power unit for the purposes described, and a clamp securing the aforesaid steering knob to the rim of the steering wheel.

17. In an apparatus of the type described, the combination with an automotive steering wheel of a steering knob attached on or near its periphery, an electric switch mounted in and forming a part of said steering knob, said switch including a stationary member and a revoluble member, means for transferring electric current from the stationary member to the revoluble member, wiring from said switch to a power unit for the purposes described, means for attaching the aforesaid steering knob to the rim of the steering wheel, a steering wheel having a hollow spoke, and wiring from the knob switch disposed within the aforesaid hollow spoke of the steering wheel.

MORRELL Q. LEAMING.